June 14, 1927.

R. WILLHEIM

PROTECTIVE SYSTEM

Filed Aug. 31, 1925

1,632,573

Inventor:
Raoul Willheim;
by
His Attorney.

Patented June 14, 1927.

1,632,573

UNITED STATES PATENT OFFICE.

RAOUL WILLHEIM, OF VIENNA, AUSTRIA, ASSIGNOR TO GENERAL ELECTRIC COMPANY, A CORPORATION OF NEW YORK.

PROTECTIVE SYSTEM.

Application filed August 31, 1925, Serial No. 53,697, and in Germany September 20, 1924.

My invention relates to improvements in protective systems for parallel lines and has for an object to provide an improved discriminating protective arrangement for a plurality of parallel lines.

My invention will be better understood from the following description taken in connection with the accompanying drawing and its scope will be pointed out in the appended claims.

Figure 1:
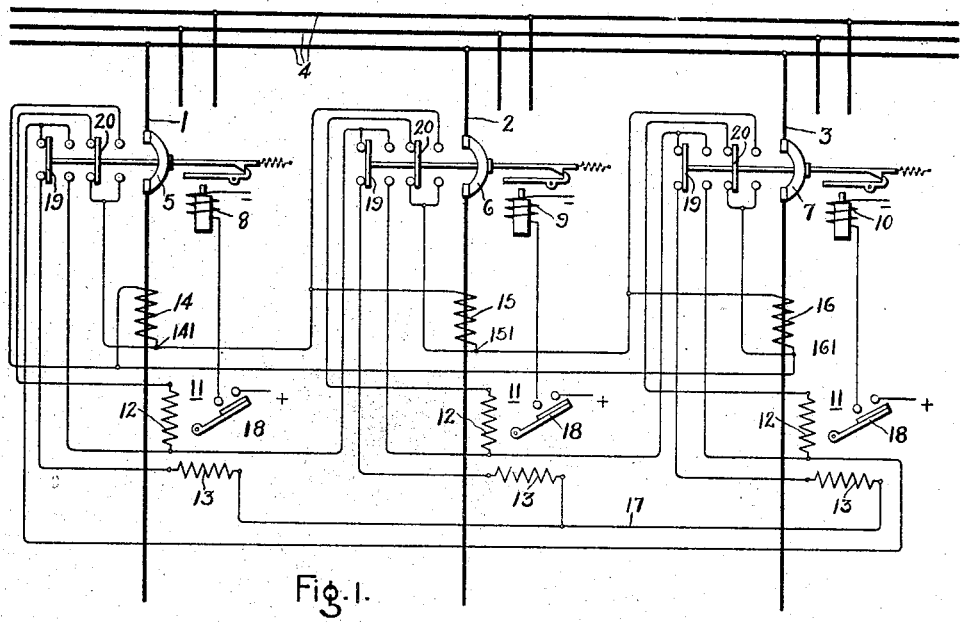
Figure 2:
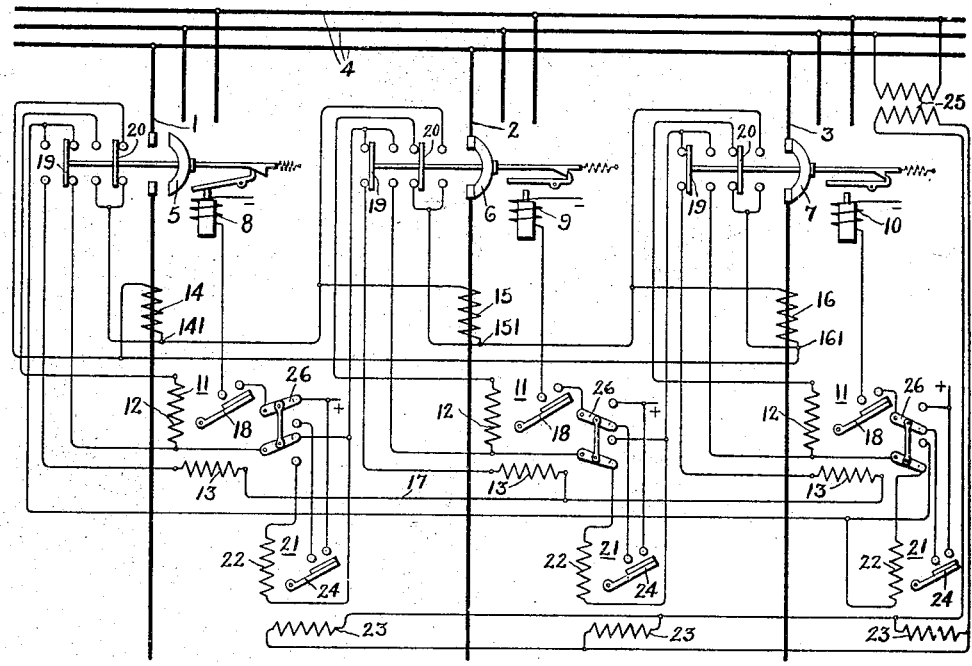

In the accompanying drawing, Figs. 1 and 2 illustrate diagrammatically an embodiment of my invention, Fig. 2 showing in particular an arrangement for protecting a system of parallel lines when the number in service is reduced to two.

Parallel feeders 1, 2 and 3, connected to a bus 4 and shown single phase for clearness, are arranged to be controlled by circuit interrupters 5, 6 and 7 respectively through suitable tripping means 8, 9 and 10.

For discriminating control of the circuit interrupters 1, 2 and 3 on the occurrence of faulty line conditions, I provide in accordance with my invention, means comprising a relay 11 for each line. This relay has two cooperating windings 12 and 13 connected to be energized respectively in accordance with the differences between the current in the line with which the relay is associated and another line and between the currents in a third line and the line with which the relay is associated, these differences being taken in a cyclic order relatively to the lines 1, 2 and 3. For this purpose, I provide current transformers associated with the lines and having secondaries 14, 15 and 16 connected in a closed circuit normally for circulating current and arranged normally to provide equal currents. The windings 12 of the relays 11 are connected to corresponding terminals 141, 151 and 161 of the current transformer secondaries 14, 15 and 16, and in series with the other winding 13 of the cyclically following relay, the free ends of the windings 13 being connected together as by a common lead 17. The relays 11 are preferably of the wattmeter type, thereby securing sensitive operation and are provided with contact controlling members 18 arranged to control the circuits of the tripping means 8, 9 and 10.

In order to by-pass the current transformer secondary and open circuit the windings 12 and 13 of the relay 11 in a line out of service, I provide suitable means such as auxiliary switches 19 and 20 associated with the circuit interrupters and operative thereby. Normally, that is, with the circuit interrupters closed, the auxiliary switches 20, as shown in Fig. 1, connect the windings 12 of the relays 11 to the corresponding terminals of the current transformer secondaries. Normally, the auxiliary switches 19 connect the windings 12 of the relays 11 in series with the windings 13 so that the winding 12 of one relay is connected in series with the winding 13 of the cyclically following relay. Upon the opening of a circuit interrupter, for example, in line 1 as shown in Fig. 2, the auxiliary switch 20 opens the circuit of the winding 12 of the relay 11 in line 1 and completes a circuit around the current transformer secondary 14 so that its impedance is eliminated from the circulating current circuit. At the same time the auxiliary switch 19 opens the circuit of the winding 13 of the relay 11 associated with line 1 and completes a circuit which maintains the system of relay connections in accordance with my invention but with one line out of service.

Referring now to Fig. 1 and assuming normal conditions, that is, substantially the same value of current in each line or, if one line normally carries more current than another, the same value of current in each of the current transformer secondaries 14, 15 and 16, a current of this value will circulate in the closed circuit of the current transformer secondaries but not in the relay windings 12 and 13. Upon the occurrence of a disturbance in the balance of the currents in the lines as may be caused by a fault, the relays will become energized by the resultant or difference currents. The torques, which these difference currents will produce in a two coil wattmeter type of relay, such as 11, are proportional to the product of the currents in the two windings 12 and 13. Assuming the line currents as $I_1$, $I_2$, $I_3$, these torques may, for illustration, be tabulated as follows:

| Relay 11. | Torque. | Relay winding. | |
|---|---|---|---|
| | | 12. | 13. |
| Line 1 | $T_1 = K_1$ | $(I_1-I_2)$ | $(I_3-I_1)$ |
| Line 2 | $T_2 = K_2$ | $(I_2-I_3)$ | $(I_1-I_2)$ |
| Line 3 | $T_3 = K_3$ | $(I_3-I_1)$ | $(I_2-I_3)$ |

It will therefore be obvious that, since with a fault on one line the currents in the other lines tend to remain substantially equal, only the relay in the faulty line will operate. For example, with a fault on line 1, the differences $(I_1-I_2)$ and $(I_3-I_1)$ are actually existent, while the difference $(I_2-I_3)$ is substantially zero. Therefore the relay 11 associated with the faulty line has a substantial torque to actuate its contact controlling member 18, while the torques of the relays 11 in the sound lines are substantially zero since one of the torque factors is zero. Consequently, the circuit interrupter of the faulty line is selected for opening without disturbance to sound lines.

When the number of lines in service is reduced to two, this feature of selectivity disappears since in this case there can be but one difference current which, since it flows in both coils of the two relays 11 will produce like torques and therefore cause the operation of both relays. This will result in tripping the circuit interrupter in the sound as well as the faulty line. Under such conditions, it is desirable to provide some alternative protective arrangement which will provide discriminating protection when only two lines are to be considered and which can be switched into service under these conditions as illustrated in Fig. 2.

This alternative arrangement may comprise relays 21 also of the wattmeter type. These relays have cooperating current and potential windings 22 and 23 respectively, and circuit controlling members 24. The potential windings 23 may be energized from a potential transformer 25 connected across the bus 4 as shown. The current coils 22 are arranged to be controlled by switches 26 so as normally to be deenergized but adapted to be connected in circuit with the current transformers of the two remaining lines so as to be energized by the difference between the currents in these lines. Inasmuch as discrimination is required and the relays 11 both act at the same time, the relays 21 must provide the discrimination. This results, of course, from the directional effect of the difference current, and to make use of this the switches 26 are arranged so that when moved to the positions shown in connection with lines 2 and 3, Fig. 2, they connect the contacts of the relay 11 in series with the contacts of the relay 21 in the trip circuit of the circuit breaker controlled by these relays. Normally, all the switches 26 are in the position shown in connection with line 1 of Fig. 2, but when only two lines are left in service such as 2 and 3, Fig. 2, the switches 26 of these lines are moved to the position shown in Fig. 2.

If a fault occurs on line 2, both relays 11 of lines 2 and 3 will close their contacts, but the difference current $(I_2-I_3)$ affects the relay 21 of line 2 to close its contacts, and the relay 21 of line 3 to hold its contacts open. Therefore, only the circuit interrupter in the faulty line is caused to open.

While I have shown my invention as applied to only three parallel lines and to only one phase of these lines, its application to more than three lines will be obvious as a mere extension of the apparatus, the principal feature being to maintain the cyclic order of connections described, and likewise its application to more than one phase will be obvious as being substantial repetitions of the apparatus shown for one phase.

What I claim as new and desire to secure by Letters Patent of the United States, is:—

1. A protective system for parallel lines comprising a relay for each line, each of said relays having two cooperating windings connected to be energized respectively in accordance with the differences between the currents in the line with which the relay is associated and another line and between the currents in a third line and the line with which the relay is associated.

2. In a protective system for more than two parallel lines wherein a plurality of current transformers respectively associated with the lines have their secondaries connected in a closed circuit normally for circulating current, a relay associated with each line and comprising two cooperating windings, one winding of the relays being connected to corresponding terminals of the current transformer secondaries and in series with the other winding of the cyclically following relay and the free ends of said other windings being connected together.

3. A protective system for parallel lines comprising a relay associated with each line and having two cooperating windings characterized by the fact that one winding of the relays is connected to be energized by a current proportional to the difference between the currents in the line with which the relay is associated and another line and that the other winding of the relays is connected to be energized by a current proportional to the difference between the currents in a third line and the line with which the relay is associated, said differences being taken in a cyclic order relatively to said lines.

4. In a protective system for parallel lines wherein a circuit interrupter is provided for each line and wherein a plurality of current transformers respectively associated with the lines have their secondaries connected normally for circulating current, a relay for each line for controlling the circuit interrupter thereof, each of said relays having two cooperating windings connected in circuit with said current transformers to be energized respectively in accordance with the differences between the currents in the line with which the relay is associated and another line and between a third line and the line with which the relay is associated and means associated with said circuit interrupters arranged upon the opening thereof to complete a circuit across the secondary of the current transformer in the faulty line and to open the circuits of the windings of the relay associated with the faulty line.

5. In a protective system for more than two parallel lines wherein a circuit interrupter is provided for each line and wherein a plurality of current transformers respectively associated with the lines have their secondaries connected in a closed circuit normally for circulating current, a relay associated with each line for opening the circuit interrupter thereof on the occurrence of a fault on the line and comprising two cooperating windings, one winding of the relays being connected to corresponding terminals of the current transformer secondaries and in series with the other winding of the cyclically following relay and the free ends of said other windings being connected together, and means associated with each of said circuit interrupters arranged upon the opening thereof to complete a circuit across the secondary of the current transformer in the faulty line and to open the circuits of the windings of the relay associated with the faulty line.

In witness whereof, I have hereunto set my hand this 18th day of August, 1925.

Dr. RAOUL WILLHEIM.